(12) United States Patent
Tucker et al.

(10) Patent No.: US 12,060,159 B2
(45) Date of Patent: Aug. 13, 2024

(54) CONDITION INDICATOR NOISE REDUCTION THROUGH OPERATIONAL PARAMETER-BASED CORRECTIONS

(71) Applicant: Bell Textron Inc., Fort Worth, TX (US)

(72) Inventors: Brian Edward Tucker, Fort Worth, TX (US); Matthew Curtis Ledbetter, North Richland Hills, TX (US); Silvio Mario Lopez, Arlington, TX (US); Drew Franklin Waller, Fort Worth, TX (US); Jobin J. Thomas, Bedford, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 309 days.

(21) Appl. No.: 17/498,473

(22) Filed: Oct. 11, 2021

(65) Prior Publication Data
US 2023/0114485 A1    Apr. 13, 2023

(51) Int. Cl.
| | | |
|---|---|---|
| *B64D 45/00* | (2006.01) | |
| *G01M 15/05* | (2006.01) | |
| *G01M 17/00* | (2006.01) | |
| *G07C 5/00* | (2006.01) | |

(52) U.S. Cl.
CPC ............ *B64D 45/00* (2013.01); *G01M 15/05* (2013.01); *G01M 17/00* (2013.01); *G07C 5/008* (2013.01); *B64D 2045/0085* (2013.01)

(58) Field of Classification Search
CPC ........... B64D 45/00; B64D 2045/0085; G01M 15/05; G01M 17/00; G07C 5/008
USPC ........................................................ 701/31.4
See application file for complete search history.

(56) References Cited

U.S. PATENT DOCUMENTS

| | | | |
|---|---|---|---|
| 10,360,737 B2 * | 7/2019 | Sheldon | .................... G07C 5/00 |
| 2018/0164760 A1 * | 6/2018 | Felke | ...................... G05B 23/02 |
| 2018/0197350 A1 * | 7/2018 | Kim | .................... G05B 23/0283 |

(Continued)

OTHER PUBLICATIONS

Bechoefer, E. et al., "Setting HUMS Condition Indicator Thresholds by Modeling Aircraft and Torque Band Variance," IEEEAC Paper #1104, Version 3, Updated Dec. 2, 2003, 2004 IEEE, 2004, 6 pages.

(Continued)

*Primary Examiner* — Hunter B Lonsberry
*Assistant Examiner* — Helen Li
(74) *Attorney, Agent, or Firm* — SLATER MATSIL, LLP

(57) ABSTRACT

A system and method for reducing data noise for vehicle monitoring sensors using parameter-based correction. The system includes a sensor operable to make a sensor reading and generate a sensor signal, and a data server operable to acquire a condition indicator model correlating operational parameters with condition indicators, and to acquire a current condition indicator according to the sensor signal, the data server further operable to generate an adjusted condition indicator by adjusting the current condition indicator according to the condition indicator model, and to determine whether an alert condition is indicated, according to at least the adjusted condition indicator, by a condition indicator set that includes the adjusted condition indicator, and to provide an alert in response to determining that the alert condition is indicated.

19 Claims, 11 Drawing Sheets

(56) References Cited

U.S. PATENT DOCUMENTS

2018/0297718 A1* 10/2018 Adibhatla .............. G07C 5/006

OTHER PUBLICATIONS

Bechoefer, E. et al., "A Control Theory Approach to Machinery Health Prognostics," Presented at the American Helicopter Society 66th Annual Forum, Phoenix AZ, May 11-13, 2010, 8 pages.

Dempsey, P.J. et al., "Investigation of Current Methods to Identify Helicopter Gear Health," 2007 IEEE Aerospace Conference, Mar. 3-10, 2007, 14 pages.

* cited by examiner

CONDITION INDICATOR NOISE REDUCTION THROUGH OPERATIONAL PARAMETER-BASED CORRECTIONS

TECHNICAL FIELD

The present invention relates generally to a system and method for managing vehicle sensor systems, and, in particular embodiments, to a system and method for reducing data noise for vehicle monitoring sensors.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload. The systems for engines, transmissions, drive system, rotors, and the like, are critical to the safe operation of the rotorcraft in flight. The elements of system such as mechanical systems, electrical systems, hydraulic systems, and the like, are each subject to unique wear factors and monitoring, inspection or maintenance requirements.

Many rotorcraft (and other vehicles) are fitted with condition and health monitoring equipment to determine when components or operating elements may wear out. For example, a rotorcraft may have a health and usage monitoring system (HUMS) which may use vibration and/or speed data (from accelerometers and tachometers) to determine the condition of components of a drivetrain or rotor. To do so, the condition data, such as raw sensor data received from a sensor, processed data acquired from raw sensor data or a sensor signal, or the like is processed, and features are extracted from the processed data. These features are called "condition indicators" (CIs), and the CIs may be monitored over time to find changes in performance, for example, by monitoring features such as vibration, that may indicate a change in the state of the monitored component. The possible states may include, for example, "healthy" or "deteriorated." When the state of a monitored component deteriorates past an acceptable point, an alert condition may be identified, and an alert may be triggered to notify the relevant personnel to address the alert condition.

Often, data is not taken continuously, but only in certain reference conditions or operating ranges. For example, HUMS vibration data is typically taken within regimes or capture windows associated with specific operating ranges, such as ranges of operational parameters (e.g., airspeed between 100-130 kts, torque within a particular range, etc.). This is done to provide a repeatable reference condition and to ensure that data from different acquisitions are comparable so that any changes in the data are due to component degradation, rather than operational parameters. For example, a rotorcraft at hover may exhibit greater transmission system vibration, but less airframe vibration, than the same rotorcraft operating at maximum forward airspeed.

However, the range for a capture window must be wide enough to ensure data is acquired during normal operations. Ultimately, capture windows are a compromise of ranges that are narrow enough to ensure comparable data, but that are wide enough to ensure regular acquisitions are completed. Vibration data or features may be correlated with the operational parameters, and, therefore, the capture window's ranges may contribute to additional noise in the resulting condition indicators or features derived from the acquired vibration data. Differences in operational conditions (torque, airspeed, rpm), even within a particular window, may introduce noise into the resulting indicator. This noise makes discerning component degradation difficult.

This additional noise may be due to operational parameters associated with the vibration data, introducing epistemic uncertainty present into the CI measurements. Epistemic uncertainty in the measurements is in addition to aleatoric uncertainty present in the CI measurements due to truly random effects, and which cannot be removed.

Since CI data is used to diagnose faults, having noise is undesirable, as this may cause overlap between healthy and faulty component data. If a threshold to diagnose a particular problem is set too low, noisy data will cause false alarms. If the threshold is set too high, actual problems may be missed (sometimes referred to as "missed hits"). Noise reduction reduces epistemic uncertainty and improves the ability to use CI data for accurate fault diagnosis. Some aleatoric uncertainly may remain after noise reduction. However, reduction of the epistemic uncertainly provides for greater separability between healthy and faulty component data, which reduces both false alarms and missed hits when analyzing condition indicators to determine component performance issues such as component failures or impending problems.

SUMMARY

An embodiment system includes a sensor operable to make a sensor reading for a vehicle during operation of the vehicle and generate a sensor signal associated with the sensor reading, and a data server operable to acquire a condition indicator model that correlates one or more operational parameters with condition indicators, wherein the data server is further operable to acquire a current condition indicator according to the sensor signal, wherein the current condition indicator is associated with the one or more operational parameters, wherein the data server is further operable to generate an adjusted condition indicator by adjusting the current condition indicator according to the condition indicator model, wherein the data server is further operable to determine whether an alert condition is indicated, according to at least the adjusted condition indicator, by a condition indicator set that includes the adjusted condition indicator, and wherein the data server is further operable to provide an alert in response to determining that the alert condition is indicated.

An embodiment data server includes a processor, and a non-transitory computer-readable storage medium storing a program to be executed by the processor, the program including instructions for receiving data indicating a sensor reading taken for machinery during operation of the machinery, acquiring a condition indicator model that correlates one or more operational parameters with condition indicators, acquiring a current condition indicator associated with the sensor reading, wherein the current condition indicator is associated with a measured operational parameter that is within the one or more operational parameters, generating an adjusted condition indicator by adjusting the current condition indicator according to the condition indicator model, determining whether an alert condition is indicated, according to at least the adjusted condition indicator, by a condition indicator set that includes the adjusted condition indicator, and providing an alert in response to determining that the alert condition is indicated.

An embodiment method includes acquiring first data indicating a first sensor reading, acquiring a condition indicator model associated with one or more operational parameters and one or more condition indicators, acquiring a current condition indicator according to the first data, wherein the current condition indicator is for an index (i), generating an adjusted condition indicator for the index (i) by adjusting the current condition indicator according to the condition indicator model, determining, according to at least the adjusted condition indicator, whether an alert condition is indicated by a condition indicator set that includes the adjusted condition indicator, and providing an alert in response to determining that the alert condition is indicated.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
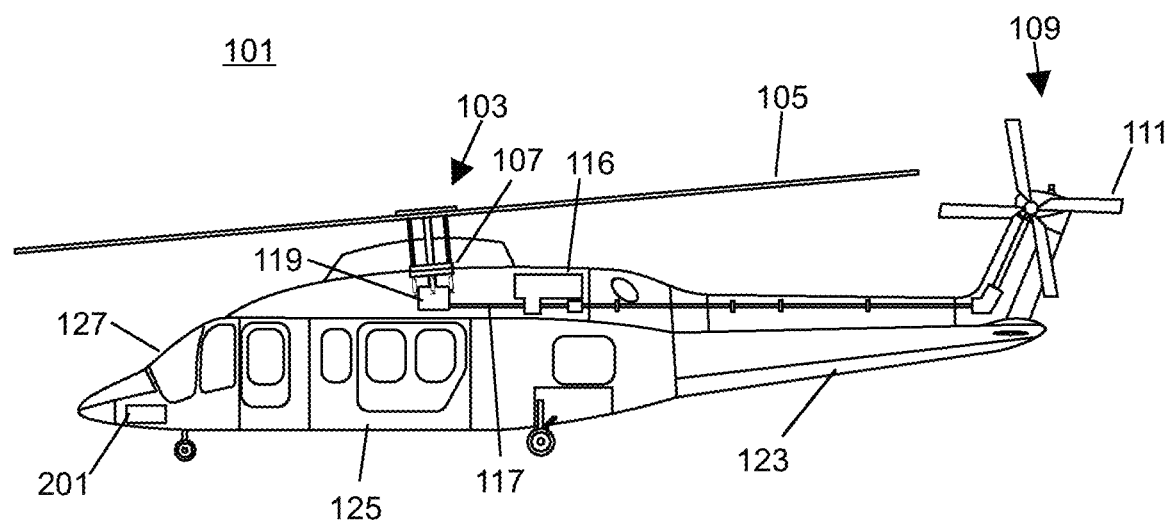
FIG. 1 illustrates a rotorcraft according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures provide for default or suggested control positioning, or the like.

Embodiments of the system presented herein are directed to providing a system for measuring performance in a vehicle, and determining condition indicators from raw sensor data, sensor signals, or the like. Condition data, raw sensor data received from a sensor, processed data acquired from raw sensor data or a sensor signal, or the like is and CIs are determined from the processed data. Each CI may be a single value represented by a data point such as a numerical value. The CIs may be adjusted to generate adjusted condition indicators to reduce the noise in the measured raw sensor data. The adjusted condition indicators may be used to analyze the performance of a component in order to more accurately provide condition alerts to operators and technicians with reduced noise in the data. In some embodiments, a reporting system receives signals from one or more sensors, and determines adjusted condition indicators that may indicate the magnitude or other properties of performance variables such as vibration or the like. The condition indicators may be adjusted using a model to correct for noise in the condition indicators. The model may be associated with a particular operating range, regime, or range of operational parameters so that condition indicators associated with the operating range may be adjusted according to the operating range. The system analyzes one or more of the adjusted condition indicators associated with a particular component to determine whether the condition indicators indicate a problem with a particular component. The analysis may be used to determine that the condition indicators for a particular component indicate a problem due to, for example, wear, damage, or the like. For example, vibration associated with a fuel pump, transmission gear, engine turbine, or the like, is measured and the associated measurements or CIs are adjusted based on the operating range measurements to accurately track changes in the vibration of the relevant element. CIs associated with a change outside of an alert threshold may indicate that the component may need inspection, repair or replacement.

In some embodiments, a CI may be adjusted to account for noise in a system before alert analysis or detection is performed. The sensor data or CI adjustment may be performed by generating a model for nominal operation of a system, and comparing the nominal operation of the system to the typical, or actual, operation of the system to generate a correction factor that can then be applied to the received or processed sensor data.

In some embodiments, the system may use the adjusted CIs to determine whether an alert is triggered. For example, an adjusted CI may be compared directly to one or more alert thresholds to determine whether an alert should be triggered. In another example, multiple adjusted CIs may compared to the alert thresholds, either directly, or as part of a calculated data set such as an average or filter. In yet another example, a moving average of the adjusted condition indicators, such as an exponential moving average (EMA), may be used to compare to an alert threshold, or to determine an alert condition for the associated component, through, for example, moving average convergence divergence (MACD) analysis. When an alert should be triggered, the system may provide an alert through, for example, an indicator in the vehicle, through a report, through a web interface accessible through a server, through an automated message, or the like.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 116. There may be one or more engines 116, which may be controlled according to signals from the FBW system. The output of the engines 116 is provided to a driveshaft 117, which is mechanically and operatively coupled to the rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely. In yet other contemplated embodiments, rotorcraft 101 could be configured as an unmanned vehicle, in which case cockpit 127 could be eliminated entirely in order to save space and cost.

Figure 2:
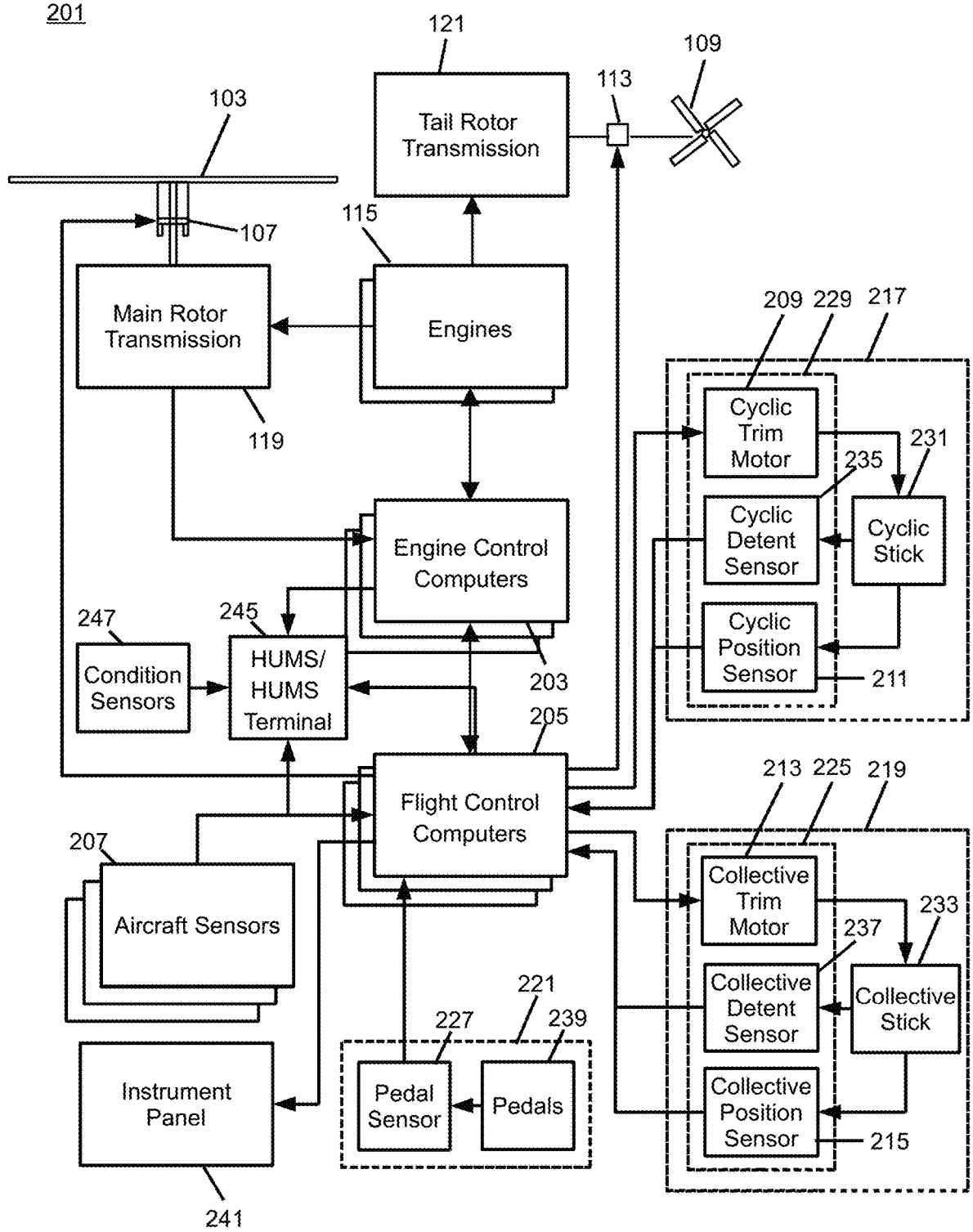
FIG. 2 illustrates a fly-by-wire flight control system for a rotorcraft according to some embodiments.

FIG. 2 illustrates a fly-by-wire flight control system 201 for a rotorcraft according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades in or to change the power output of the engines 116, as examples. Flight control devices include systems such as the swashplate 107, tail rotor actuator 113, and systems operable to control the engines 116. The flight control system 201 may adjust the flight control devices independently of the flight crew in order to stabilize the rotorcraft, reduce workload of the flight crew, and the like. The flight control system 201 includes engine control computers (ECCUs) 203, flight control computers (FCCs) 205, and aircraft sensors 207, which collectively adjust the flight control devices and monitor the rotorcraft during operation.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cues to the pilot controls or display information in instruments on, for example, an instrument panel 241.

The ECCUs 203 control the engines 116. For example, the ECCUs 203 may vary the output power of the engines 116 to control the rotational speed of the main rotor blades or the tail rotor blades. The ECCUs 203 may control the output power of the engines 116 according to commands from the FCCs 205, or may do so based on feedback such as measured revolutions per minute (RPM) of the main rotor blades.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 116, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The suggested cyclic stick position is a positon determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 206 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 116, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. Additionally, the cyclic control assembly 217, collective control assembly 219 and/or pedal control assembly 221 may each have one or more detent sensors that determine whether the pilot is handling a particular control device. The FCCs 205 may provide different default control or automated commands to one or more flight systems based on the detent status of a particular stick or pilot control.

The aircraft sensors 207 may be in communication with the FCCs 205, and a health and usage monitoring system (HUMS) 245. The aircraft sensors 207 may include sensors for monitoring operation of the rotorcraft, providing pilot data, providing condition data, or the like, and may include measuring a variety of rotorcraft systems, operating conditions, flight parameters, environmental conditions, and the like. For example, the aircraft sensors 207 may include sensors for gathering flight data, and may include sensors for measuring airspeed, altitude, attitude, position, orientation, temperature, airspeed, vertical speed, and the like. The aircraft sensors 207 may include sensors relying upon data or signals originating external to the rotorcraft, such as a global positioning system (GPS) sensor, a very high frequency (VHF) omnidirectional range sensor, Instrument Landing System (ILS), and the like. Additionally, one or more condition sensors 247 may be connected to the HUMS 245 and may include sensors for reading condition data such as vibration, device rotational speed, electrical operating characteristics, fluid flows, stress, operating temperatures, or the like.

The flight control system 201 may further include the HUMS 245 or a HUMS terminal. In some embodiments, the HUMS 245 collects data from flight control system 201 elements for storage and later download, analysis, or the like. In some embodiments, the HUMS 245 may be connected to one or more aircraft sensors 207, FCCs 205, ECCUs 203, standalone sensors, sensors integrated into the HUMS 245, condition sensors 247, or other system components, or a combination of components. In some embodiments, the HUMS 245 may be separate from the FCCs 205, and may be implemented as a standalone system that communicates with, but that is operationally separate from, other elements of the flight control system 201. The HUMS 245 may be a terminal that stores raw sensor data from one or more aircraft components, and provides the raw sensor data to a server for interpretation and analysis. In other embodiments, the HUMS 245 may interpret raw sensor data to determine one or more condition indicators for a server or other system that analyzes or displays the data. In yet another embodiment, the HUMS 245 may analyze the raw sensor data or condition indicators to determine a problem indicated by a CI or a data set, and may display or indicate the interpreted data, an alert, a warning, a system status, or like, on the instrument panel 241, on a dedicated display, through an audible warning, within another display such as a flight director display, though a tactile feedback system, or the like. The HUMS 245 may use data from the aircraft sensor 207 to determine one or more component performance characteristics, such as vibration. For example, the HUMS 245 may use a combination of vibration data and rotational speed data to generate synchronous vibration data or other transformed data types, which may be analyzed for indications of developing problems with specific components associated with the vibration data.

Embodiments of the presented principles are directed to a system and method for reading sensor data, adjusting the condition indicators associated with the sensor data using a model to remove noise in the sensor data, for example, through correlating the condition indicators with vehicle operational parameters. In some embodiments, the systems use models to develop one or more correction factors to remove operational parameter induced noise from the sensor data. Using parameter based corrections to generate the adjusted condition indicators may permit more easily implemented corrections by avoiding a need to predetermine a relationship between condition indicators and operational parameters under different operation conditions.

In some embodiments, the HUMS 245 may adjust the raw sensor data or CIs using one or more models to generate adjusted CIs. The adjusted CIs may be analyzed for indications of a deteriorating part or system, with the adjustment to the condition indicators removing noise from the sensor readings and providing increased detection accuracy.

Condition indicators may vary as a function of operational parameters or performance characteristics, such as a vibration or other condition indicator value varying as a function of torque and RPM, and thresholds for determining an alarm condition may be associated with the particular vehicle and operational parameters, such as torque mean values and variances. Operational parameters may be related to, or reflect conditions under which a particular component operates, and may be derived from, correlated with, or otherwise associated with data measured for a particular performance statistic for a component. Parameter based adjustments to sensor data permit improved monitoring of vehicle performance by allowing for broader observation windows or parameter bands. Using parameter based adjustments permits computationally efficient, yet rapid and accurate, noise correction to improve system monitoring.

Embodiments of the presented principles are directed to providing a model that can used to adjust condition indicators to reduce noise. In some embodiments, a model is trained using a population of CIs and operational parameters. The trained model may subsequently be used to "de-noise" the CIs. In some embodiments, a system models the effect that operational parameters, such as torque, have on CIs. In some embodiments, the model may be generated using data from previous or historical system operations, from nominal or manufacturer provided data, from fleet-wide data, or the like. For new observations or data readings, the operational parameter values are used to calculate an indicator correction value. The correction value is applied to current or received indicator values or sensor data to generate an adjusted condition indicator or corrected condition indicator, and the corrected conditions indicator may be uses in condition indicator analysis such as element failure, error detection, system analysis, or the like. The adjusted indicator value has less noise than the raw sensor data or original measured condition indicator, improving the detection of threshold conditions, errors, and the like, in the condition indicator analysis.

In some embodiments, a model is trained using previously received data. The model may be a simple model using, for example, linear regression, or a complex model, for example, a model generated using machine learning. Other methods to model vibration based on operational parameters, such as Kalman filters, may be computationally intensive to implement. One or more indicator correction values may be calculated using the model, and each adjusted indicator value may be generated from a received condition indicator and a respective indicator correction value to remove noise in each of the condition indicators induced by differences in operational parameter data.

Figure 3:
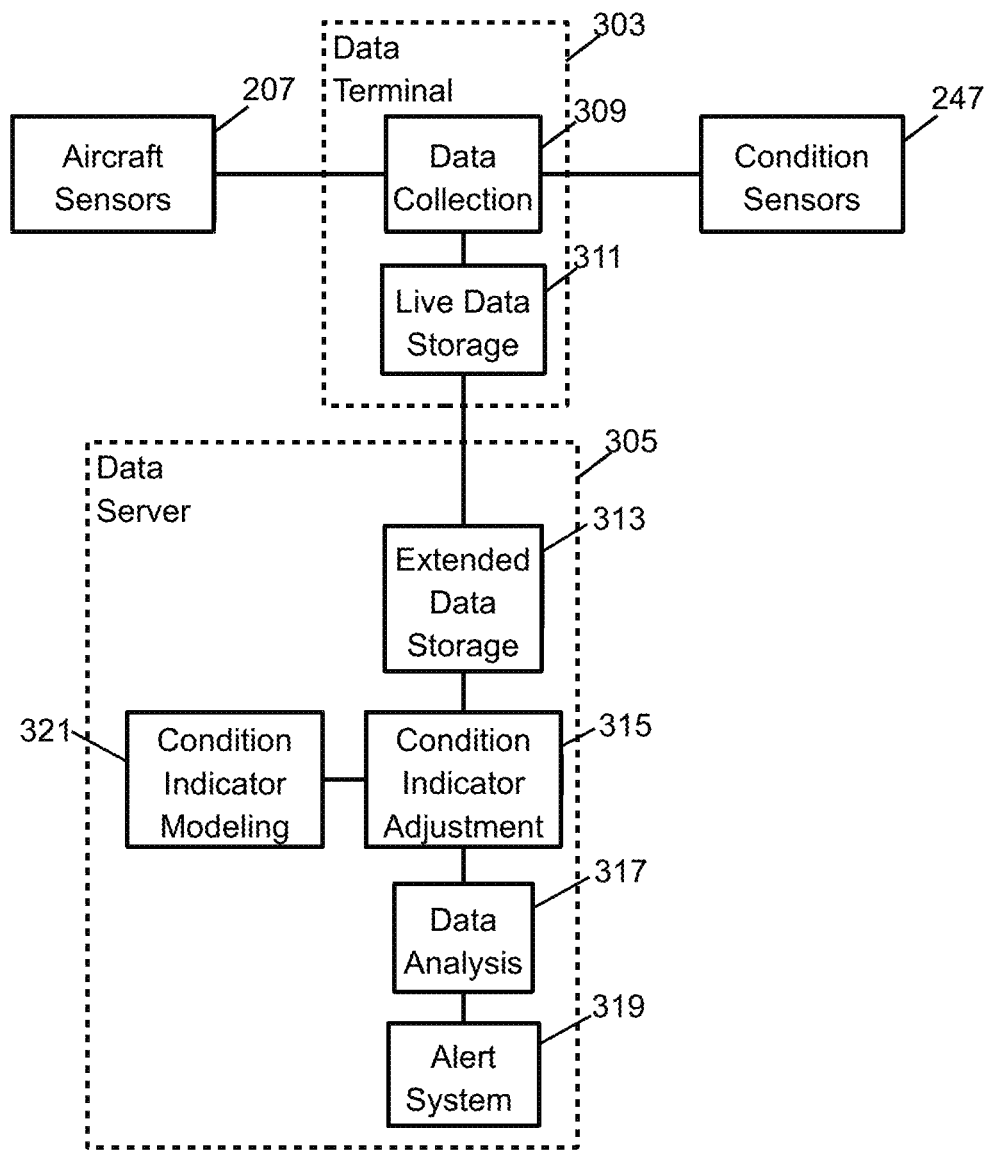
FIG. 3 is a block diagram illustrating a HUMS for gathering, processing, and analysis of condition indicators according to some embodiments.

FIG. 3 is a block diagram illustrating a HUMS 301 for gathering, processing, and analysis of condition indicators according to some embodiments. The HUMS 301 may include a data terminal 303 that is connected to one or more condition sensors 247, aircraft sensors 207, and a data server 305. The aircraft sensor 207 may be sensors that gather flight data such as airspeed, altitude, attitude, position, orientation, temperature, airspeed, vertical speed, and the like. The condition sensors 247, as discussed above, and may take sensor readings and generate one or more sensor signals such as electrical signals, data elements, or the like, that indicate condition data or one or more operational parameters. For example, a condition sensor 247 may be a vibration sensor near an engine, gear set or transmission that detects vibrations from the local components. In another example, the condition sensor 247 may be a voltage sensor or current detector that detects the voltage or current drawn by an electrical component such as a pump or a motor. In yet another example, the condition sensor 247 may be a pressure or flow sensor that detects the pressure of a hydraulic line or fuel line, the flow rate of a fluid such as fuel, coolant, oil hydraulic fluid, or the like. The data generated by the sensors may be condition data, and may be used directly as CIs by the HUMS 301 for operational monitoring, or may be used to generate one or more associated CIs. For example, an electrical sensor may monitor a current drawn by an electrical pump to infer operating speed, RPM or flow rate conditional indicators, and one or more conditional indicator may be used as CI data for adjustment and subsequent use in operational monitoring. In another example, a vibration sensor may send raw sensor data such as accelerometer vibration data to the HUMS 301, and the HUMS 301 may determine a CI according to the root mean square (RMS) of the accelerator vibration data. In yet another example, the HUMS 301 may determine the magnitude of a vibration at a particular frequency from frequency spectrum data using, for example, a Fourier analysis or other technique.

The data terminal 303 may be a computer or other device that receives the sensor signals and stores data from the sensor signals locally for later analysis. In some embodiments, one or more of the HUMS terminal, the FCCs or ECCUs are data terminals 303. The data terminal 303 has a data collection element 309 that is a data handling element such as a processor, data collection circuit or device, or the like. In some embodiments, the data terminal 303 is a HUMS terminal that is a centralized device or standalone device that collects raw sensor data from the condition sensors 247 and that generates condition indicators from the raw sensor data processed data, or from a sensor signal, or that collects condition indicators from the condition sensors 247. In other embodiments, the data terminal 303 is a HUMS terminal that receives calculated or analyzed data such as data sets, alerts, trends, or the like from smart condition sensors 247 that determine condition indicators and perform analysis on the condition indicators. In yet another embodiment, the data terminal 303 may be, or include, a network of smart condition sensors 247 that act autonomously to collect data, and may determine condition indicators and perform some analysis of the condition indicators. In such an embodiment, the smart condition sensors 247 may store the collected and calculated data or analysis for delivery directly to the data server 305. In some embodiments, the data collection element 309 also includes a communications circuit that receives the sensor signal from the condition sensors 247 and provides the sensor signal to the data collection element 309, which saves a condition indicator based on the sensor signal in live data storage 311.

The data terminal 303 collects a series of data points related to condition indicators for conditions that the data server 305 monitors. In some embodiments, the data server 305 receives raw sensor data or condition data from the data terminal 303 or from the sensors 247 associated with the data terminal 303, and performs analysis to determine condition indicators from the condition data or raw sensor data. In other embodiments, the data terminal 303 performs the analysis and sends processed data, such as a condition indicator, data sample, or the like, to the data server 305.

In some embodiments, the condition data may be associated with one or more data points, data sets, raw sensor data points, condition indicators, or the like. Additionally, processing the condition data may include isolating a condition indicator from the condition data or raw sensor data. For example, the data terminal 303 may acquire a sensor signal having condition data or raw data from a vibration sensor adjacent to a main rotor transmission. The sensor signal may be a sample of the data over a predetermined period of time, and may include data from multiple vibration sources. The sensor signal may be analyzed, by the data terminal 303 or the data server 305, by, for example, filtering using Fourier analysis or the like, to isolate signals for individual condition indicators. A Fourier transform may be applied to a system or data set from a sensor, such as a data signal, to transform the data signal into a filtered signal such as a frequency domain signal, which will indicate the amplitude of different subsignals making up the data signal. The subsignals at different frequencies may be associated with different condition indicators. For example, a first gear rotating at 300 RPM will correspond to a frequency signal at a first frequency in the filtered signal, while a second gear rotating at 2000 RPM will correspond to a frequency subsignal at a second frequency in the filtered signal. Thus, a first vibration condition indicator for the first gear will correspond to a first vibration subsignal having a frequency of about 5 Hz, while a second vibration condition indicator for the second gear will correspond to a second vibration subsignal having a frequency around 33.3 Hz. In another example, CIs may be determined from synchronous time average data that is, for example, created from raw sensor data such as accelerometer vibration data and tachometer speed data. Thus, multiple condition indicators may be determined from a single sensor signal or a single sensor.

In some embodiments, the sensors 247 may perform the processing of the condition data to determine the condition indicators, and may send, for example, a data packet or other signal to data terminal 303. In other embodiments, the sensors 247 may send the condition data to the data collection element 309 of the data terminal 303, which processes the condition data to determine the condition indicators. In another embodiment, the sensors 247 may send the condition data to data terminal 303, which then passes the condition data to the data server 305 for determination of adjusted condition indicators.

In some embodiments, the data terminal 303 stores the sensor signal, or condition data from a sensor signal, as the condition indicator in the live data storage 311, and in other embodiments, the data terminal 303 processes the raw sensor data or condition data to generate a condition indicator based on, or according to, the raw sensor data or condition data before storing the condition indicator. The data terminal 303 may actively query a sensor 247, may receive a signal from a sensor 247, or may sample a signal from a sensor 247 to acquire raw sensor data or a sensor signal. The data terminal 303 may acquire the data signal at a particular time in a flight or in response to one or more operational parameters meeting a predetermined set of criteria. Thus, each condition indicator set may be associated with an operating condition or operating range, and may be referenced by an operational parameter associated with the operating condition. The data terminal 303 may acquire condition data, by sampling a continuous or live sensor signal, or querying a sensor, when the data terminal 303 detects that flight conditions or operational parameters meet one or more criteria or that the vehicle is operating within a particular operating range. For example, the data terminal 303 may be an FCC, and may determine that the engines are in a maximum takeoff power (MTOP) state based on the throttle and collective settings, and may acquire a condition data indicating, for example, vibrations of one or more components of an engine, transmission, gear train, or the like, or for fuel flow, power generation, transmission torque, or the like. In another example, the data terminal 303 may determine that the rotorcraft is in a hover, in forward flight, or in another flight state, and may acquire the condition data during the flight state.

In some embodiments, the data terminal may continuously monitor a particular sensor, condition data, or the like, and may associate measured data, condition data, raw sensor data, CIs, or the like, with a predetermined operating range or capture window associated with a specific operational parameter, operating range, such as a range of operational parameters, or other parameter. For example, a data terminal 303 may monitor a signal from a vibration sensor on a rotorcraft transmission, and may save data received while the vehicle is operating within a predetermined operating range or operational parameter (e.g., airspeed between 100-130 kts, torque within a particular range, etc.). Alternatively, the data terminal 303 may save all received data, or may save samples of data received from a sensor, and may associate relevant data points with operational parameters associated with the relevant operating conditions or operating range (e.g., airspeed was 122 kts at the time that the sensor data was acquired).

Condition indicator sets (CI sets) may be formed from measurements or condition indicators determined in relation to similar operational parameters to provide consistent data. For example, a first condition indicator set may include condition indicators for a main rotor transmission gear during MTOP across multiple flights, while a second condition indicator set may include condition indicators for the same main rotor transmission gear during hover across multiple flights. Similarly, a condition indicator set may be formed from data or condition indicators associated with the same, or similar operational parameters or operating range. Thus, a transmission vibration data set may include data readings taken by a sensor when the vehicle operates at a particular airspeed or range of airspeed, or while the engine torque is within a certain range, or the like.

The data terminal 303 may store data such as the condition data, a sample of data, condition indicators, and other sensor data or relevant identifying information in the live data storage 311. In some embodiments, the CI data may be tagged with a date, time, and operational parameter information when stored in the live data storage 311 for later transmission to the data server 305. Additionally, the data terminal 303 may store the data with information associating the CI data with a particular operating range or operational parameter.

The data server 305 aggregates data from one or more data terminals 303. The data server 305 collects data in one or more condition indicator sets for aggregation and analysis, and may provide a report, alerts or other information for individual condition indicators data sets. The data server 305 stores condition indicators, data set information, and the like, in extended data storage 313.

The data server 305 may include a condition indicator modeling element 321 that models relationships between operational parameters and condition indicators. In some embodiments, the condition indicator modeling element 321 generates a model for correction or adjustment of raw sensor data or received data, of previously adjusted or stored data, or one or more condition indicators. In some embodiments, the condition indicator modeling element 312 generates one or more CI models for static use, for example, by modeling nominal operation of a particular system feature within a selected operating range. Thus, multiple CI models may be generated to provide CI models for a variety of operating ranges, for a variety of system features, or the like. For example, a CI model may be generated for operation of a selected gear in a gearbox or transmission, with a signal or sensor associated with the selected gear. Different CI models may be generated for different operating ranges, with a separate CI model set for each sensor, measurement, CI data set, sensor signal, system component, or the like. For example, the nominal or expected vibration measured through a sensor associated with the selected gear may be modeled for a first low torque range by a first CI model, the nominal vibration for the selected gear may modeled for a second, medium magnitude torque range by a second CI model, and the nominal vibration for the selected gear may be modelled for a third, high magnitude torque range by a third CI model, and the like. Additionally, a different set of CI models may be generated for different gears, and may be associated with the same set of torque ranges, or a different set of torque ranges.

A condition indicator adjustment element 315 in the data server 305 may adjust condition indicator received from the data terminal 303 or stored in the extended data storage 313. The condition indicator adjustment element 315 may apply the CI model generated by the condition indicator modeling element 321 to one or more of the condition indicators to generate one or more adjusted condition indicators. The adjusted condition indicators have reduced noise, so that subsequent analysis is more accurate than using raw sensor data or noisy condition indicators.

A data analysis element 317 acquires the adjusted condition indicators or adjusted condition indicator information and performs analysis on the adjusted condition indicators, and saves information generated by the CI analysis into the extended data storage 313.

The data server 305 may be, for example, a server that is remote from the data terminal 303, or may be local to, or the same device as the data terminal. 303. In some embodiments, the data terminal 303 and data server 305 are both disposed in a vehicle such as a rotorcraft, and may both be implemented in one or more FCCs. In other embodiments, the data terminal 303 may be implemented in a device that is distinct from the device implementing the data server 305. For example, the data terminal 303 may be implemented in a dedicated monitoring computer or device using, for example, a purpose built processor, microcontroller, or the like, or may be implemented in an ECCU or other control computer, while the data server 305 is implemented in, for example, an FCC. In other embodiments, the data server 305 may be a diagnostic computer, remote server, or the like, that is separate from the vehicle on which the data terminal 303 is disposed. The data terminal 303 may transfer data to the data server 305 by responding to query from a maintenance computer, automatically transferring data to a remote data server 305 through a wireless connection, a manual transfer or download by a user using, for example, a non-transitory computer readable medium such as a universal serial bus (USB) stick or secure digital (SD) card, or the like.

The data server 305 attempts to detect problems associated with CIs. In some embodiments, the data server 305 has an alert system 319 that provides an alert indicating that one or more a condition indicators, after adjustment by the condition indicator adjustment element 315, has exceeded a particular threshold such as a static indicator threshold, static alert threshold or an adaptable alert threshold, a combination of the same, or the like. The alert system 319 may provide the alert to a vehicle operator, a maintenance technician, a fleet operator, a vehicle, owner, or to an automated system. The alert system 319 may be disposed in the vehicle, and include a cockpit indicator that is an audible indicator such as a buzzer or voice prompt provided through a flight director system, a graphic warning such as a note or other warning on a graphic screen, instrument screen, flight director screen, or the like, or may be provided as a dedicated visual indicator such as a dedicated a warning light, lamp, or the like. In other embodiments, the alert system 319 may be remote from the vehicle, and may provide an automated alert by generating a report with a list of conditions of concern, automatically messaging a technician or owner, providing an indicator on a monitoring system, or the like. For example, a data server 305 may be a monitoring server at a fleet operator, and, as each vehicle returns to the fleet base, the vehicle may automatically transmit condition indicators to the data server by way of a wireless link, or through a maintenance computer connected to the vehicle by a technician. The data server 305 may aggregate the newly received condition indicators for one or more monitored op parameters with existing condition indicator or alert data for the relevant performance parameter, and analyze the data to determine whether an alert should be triggered. Upon detecting that condition data for a particular operational parameter has exceeded a particular threshold such as a static alert threshold or an adaptable alert threshold, the data server 305 may generate one or more alert signals, which may include generating a problem report indicating that a particular vehicle system, element or the like needs to be inspected, replaced, or otherwise addressed by a technician. The report may be generated in response to determining that the CI data indicates a problem, or in response to query for the report. In other embodiments, the alert system 319 may generate an alert signal that automatically messages a fleet operator, vehicle owner, maintenance technician, or the like by email, short messaging system (SMS) message, text message, automated voice call, or the like. In other embodiments, the alert system 319 may generate the alert signal to display an indicator on a management web page, maintenance checklist, vehicle record, or the like. In some embodiments, the alert may indicate a severity of a problem, with the data server 305 comparing one or more CIs or CI data to multiple different thresholds. Thus, the alert may indicate the severity of a problem or condition for a particular vehicle element. In some embodiments, a vehicle-born alert and a remote alert may be used in combination. For example, a maintenance or inspection alert may be generated for a transmission gear when CI data indicates that vibration of the gear has exceeded a threshold such as a static alert threshold or an adaptable alert threshold, indicating that the transmission gear should be inspected for possible damage. The alert system 319 may generate a warning or problem message such as automated remote message and/or an in-cockpit warning when the CI data exceeds a higher threshold, indicating that further use of the gear should be avoided. Thus, the alert system 319 may take different alert actions based on the comparison of the CI data to different thresholds.

The data server 305 may use data from one or more data collection points, such as sensors 247, data collection elements 309, data terminals 303, or like, to determine whether an alert should be triggered for a particular CI. For example, the data server 305 uses one or more CIs to determine EMAs for detection of trends in the CI data, for basic threshold comparisons, to determine a derivative or slope of a data average, or the like, or may use another filtering technique, data averaging technique, or the like to analyze the adjusted condition indicators to monitor for CI data indicating potential system problems. A static alert threshold may be used to set an alert at a certain level, either positive, negative, or both.

Figure 4:
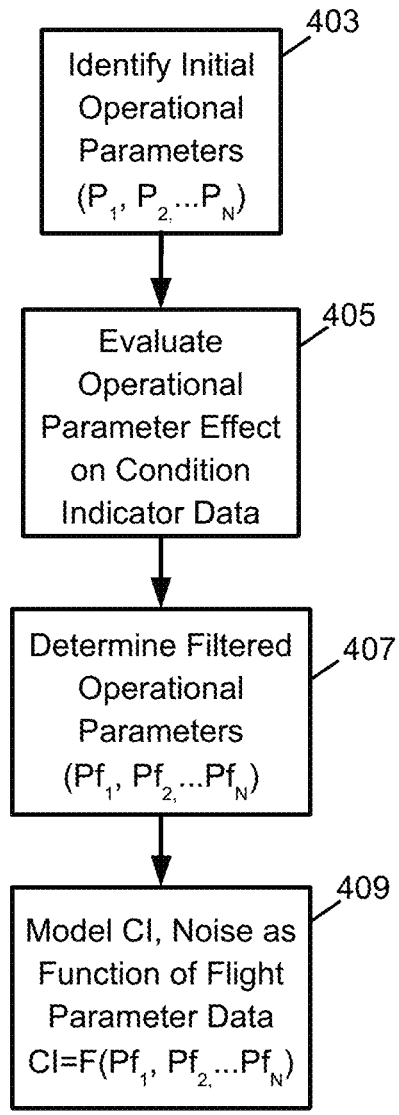
FIG. 4 is a flow diagram illustrating a method for training a CI model according to some embodiments.

FIG. 4 is a flow diagram illustrating a method 401 for training a CI model according to some embodiments. In block 403, an initial set of operational parameters ($P_1$, $P_2 \ldots P_N$) is selected for analysis with respect to the operational parameters' relevance to, or correlation with, CI data. The operational parameters may be conditions under which a particular element of a vehicle operates, or may be related to, derived from, or otherwise associated with one or more performance measurements for the element. In some embodiments, the operational parameters may be preselected, for example, by using judgment of a technician or designer, or by selecting operational parameters according to historical relevance. Alternatively, all available operational parameters associated with a particular CI or CI data may be selected for evaluation.

In block 405, an evaluation to determine the effect of a parameter on the CI data (or the CI data's sensitivity to operational parameters) is performed to identify or filter those operational parameters affecting the CIs, or to identify or filter the most relevant operational parameters affecting the CIs, of the operational parameters having the greatest effect on the CIs.

In some embodiments, one or more operational parameters may be evaluated by determining a degree of relationship or correlation between the operational parameters and the CIs. For example, the evaluation of the correlation between the operational parameters and CIs may be performed using regression (e.g., $R^2$ value), principal component analysis (PCA), actor critic reinforcement learning algorithms, or another process or algorithm. The evaluation of block 405 may be performed for each operational parameter, or combination or group of operational parameters.

Figure 5:
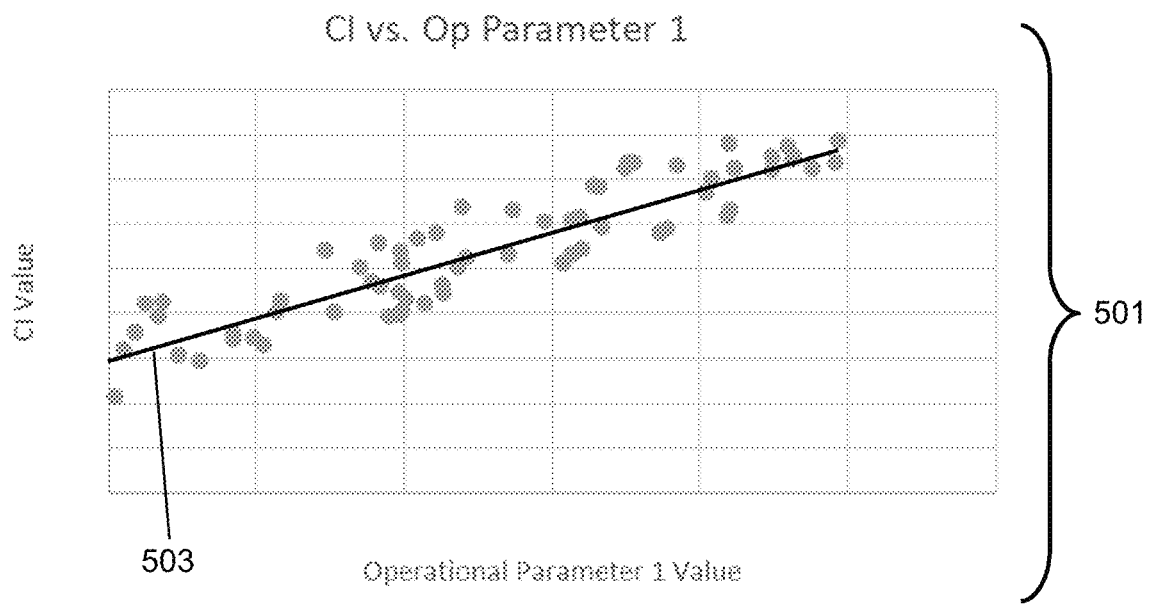
FIG. 5 illustrates an example of CI data versus two different operational parameters according to some embodiments.
Figure 5:
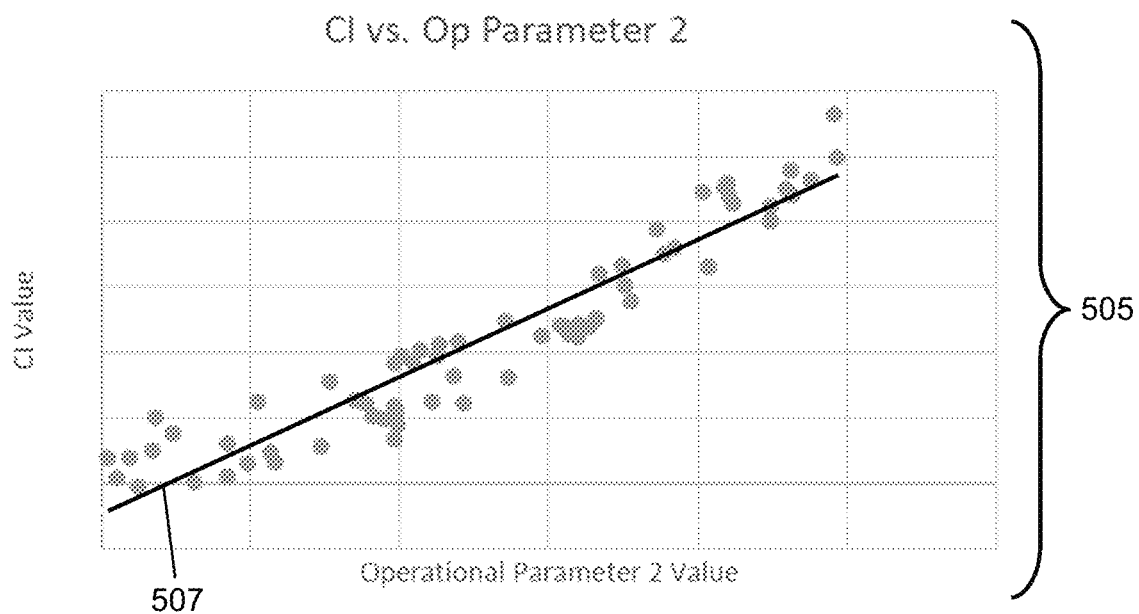

FIG. 5 illustrates an example of CIs versus two different operational parameters according to some embodiments. Both data sets 501, 505 include CIs that is highly correlated to the respective operational parameters. The CI values for the data sets 501, 505 may be a CI values for a selected type of CI, and may be the same, or may be related to the same type of CI, in the different data sets 501, 505, so that the most relevant operational parameter may be selected for the selected type of CI. For example, the CI values may be for a vibration-type CI, such has vibration measured in a transmission, while the operational parameters may be an engine RPM in the first data set 501, and engine torque in the second data set 505.

Referring again to FIG. 4, in block 407, a filtered set of parameters (Pf$_1$, Pf$_2$, . . . Pf$_N$) is determined. The filtered set of parameters (Pf$_1$, Pf$_2$, . . . Pf$_N$) may be one or more parameters selected according to the level of correlation between the CI and the respective operational parameter. The different data sets 501, 505 may be evaluated based on the level of correlation between the CI values and operational parameters. In some embodiments, the filtered set of parameters (Pf$_1$, Pf$_2$, . . . Pf$_N$) may be one or more operational parameters having a highest correlation with the CI data, one or more parameters that have a correlation with the CI values.

In some embodiments, the filtering of the parameters may be omitted. Thus, in some embodiments, all parameters that would normally be evaluated may be included in the filtered parameter set (Pf$_1$, Pf$_2$, . . . Pf$_N$) for the model training. However, where non-correlated operational parameters are included, contributions of the non-correlated operational parameters in the model would be small, but using all parameters by omitting the filtering may simplify the model generation process may provide efficiency gains over filtering the parameters.

In block 409, a CI model is generated using the CI and data indicating operational parameters. In some embodiments, a CI model may be trained, or generated, using historical CI data and the associated operational parameters. Such training may be as simple as linear regression for each parameter, for example, when linear superposition is assumed. In other embodiments, training of generating the CI model may use training methods such as multiple linear regression, non-linear regression (polynomial, exponential, logistic, etc.), machine learning techniques, or other model generation methods or processes. Machine learning techniques may, in some embodiments, include artificial neural networks, support vector machines, particle filtering, or other techniques. Additionally, in some embodiments, outlier data may be removed before model training. For example, when using historical data, data having a correlation that exceeds a predetermined threshold may be identified as outlier data, and may be excluded from the training.

This approach of generating a model for normalizing or shifting the CI value to align the actual operational parameter with the nominal operational parameter may be for an individual vehicle or piece of machinery, a fleet of vehicles, or another group of machines or devices. For example, to normalize data for a single aircraft, the model is trained using data from a specific aircraft, which would take into account any differences in the individual aircraft. For a fleet, the data from the entire fleet may be used to train the model (i.e., assuming that all aircraft, on average, behave similarly).

Referring again to FIG. 5, in some embodiments, the CI model may be generated as, for example, a linear model 503, 507 relating operational parameters in each data set 501, 505 to the DCI data. When analyzing the effects of a parameter on CI data and generating the CI model, CI data from healthy components may be used to prevent "correcting" for a healthy state. Thus, the CI data used for the parameter evaluation may be predetermined prior to analyzing evaluating the parameters or generating the model, by for example, taking baseline CI data in new components, generating the CI data through simulation, using historical or previously received data that is assumed or confirmed to be accurate or useful baseline data, receiving or using nominal CI data provided by a manufacturer, or the like, or a combination of any data sources.

Figure 6:
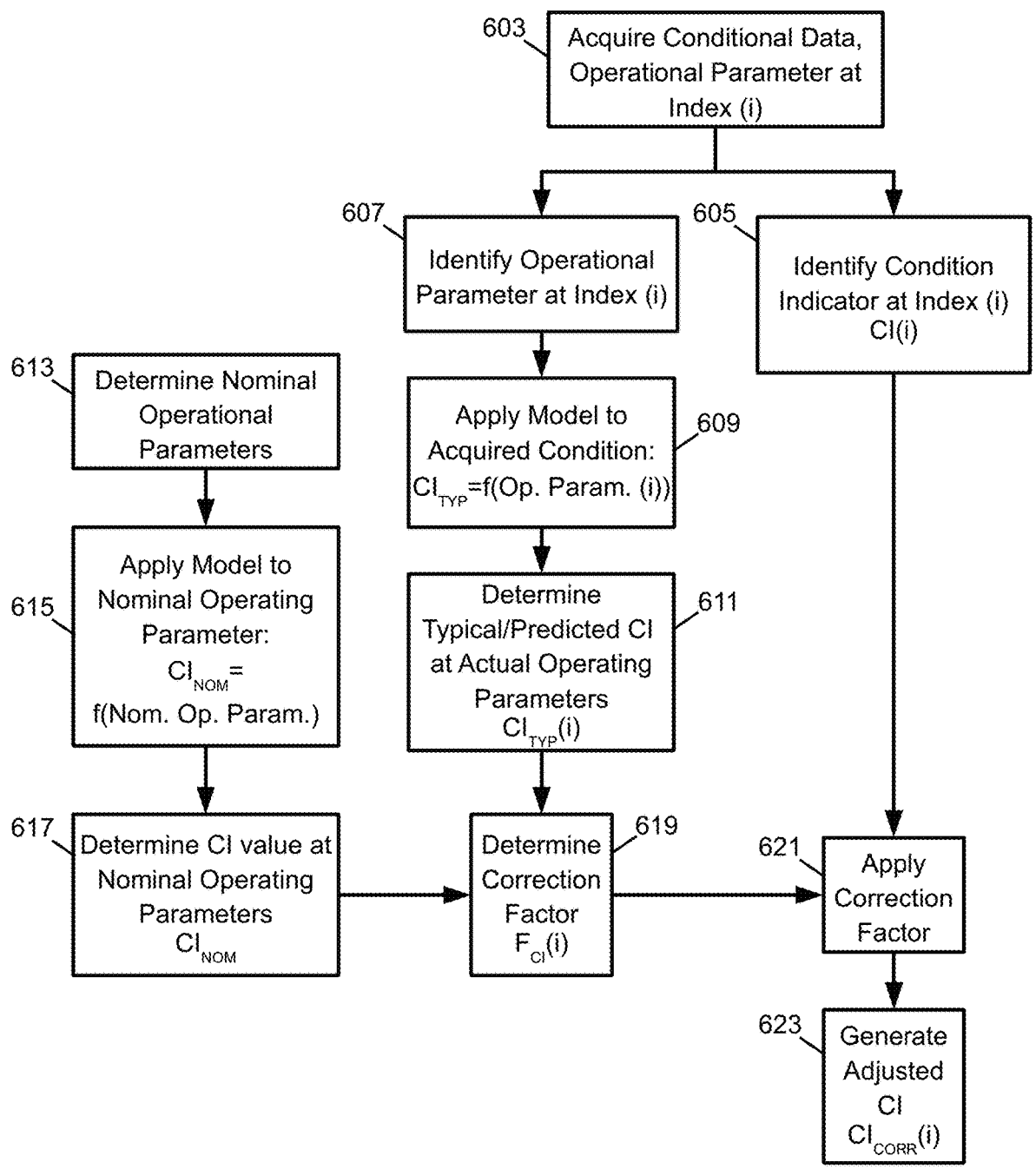
FIG. 6 illustrates a method for applying a CI model to condition data to determine a corrected CI according to some embodiments.

FIG. 6 illustrates a method 601 for applying a CI model to condition data to determine a corrected CI according to some embodiments. The method 601 is directed to removing noise from CIs to increase the accuracy of subsequent analysis for failures, alert conditions, and the like. In some embodiments, a CI model is applied to each CI in a CI set to adjust the respective CI with a nominal operational parameter. Thus, each CI data point is adjusted so that the associated operational parameters are effectively the same. In some embodiments, the CI model may be generated prior to application of the model, or in other embodiments, the CI model may be generated as part of the analysis.

In block 603, condition data and at least one operational parameter are acquired for an index (i). The condition data may be raw sensor data, sensor readings, processed data, or CIs included in a data set having one or more condition data points and one or more operational parameters associated with each condition data point. The index (i) may be a time at which a sensor reading or CI was measured, or another identifier. Operational parameters may be associated with each of the condition data points in the data set. Data may be data read from a sensor, or the like, and the operational parameter may be the associated with the actual operational conditions under which the condition data was read. In some embodiments, each operational parameter is associated with one or more operational parameters identified during the modelling to be correlated to the CI data.

In some embodiments, each operational parameter may be explicitly described or listed in the data set, and in other embodiments, the operational parameters may be implied by the nature of the data set. For example, in some embodiments, the data set may include one or more vibration measurements taken by a vibration sensor, and may include one or more engine RPM measurements listed for the vibrations readings. In another example, the data set may be associated with a particular engine RPM, and one or more readings or data points, including, for example, vibration measurements taken from different sensors at the particular engine RPM. Thus, the readings in the data set would be implicitly associated with the engine RPM since the data set is for the identified particular engine RPM without the engine RPM explicitly being listed in the data set. In yet another embodiment, the data set may have data points associated a time, and the data points in the data set may be matched to an operational parameter in another data set. For example, a data set may include multiple vibration readings that are each associated with a time at which the respective vibration reading was measured, and each vibration reading may be associated or matched, based on the measurement time, with an engine RPM value taken from a data set listing engine RPMs at various times.

In block 605, the CI may be identified for a time (i). The identified CI at time (i) (CI(i)) may be selected based on a need for analysis of a particular CI data set. The CI may be selected for an analysis as part of a data set, and with each CI in the data set being analyzed. For example, a report or analysis of vibration of a particular component may include analysis of multiple CIs at various times.

In block 607, the operational parameter at time (i) is identified. In some embodiments, the operational parameter may be selected for a particular time by matching the time for the relevant operational parameter with the time at which a particular condition data point or condition indicator was measured. The operational parameter associated with a particular condition data point or CI at a particular time by matching the times or acquisition index for the operational parameter and CI.

In block 609, the model for the relevant CI is applied to the operational parameter at index (i) (Op. Param. (i)). In some embodiments, the model is a mathematical formula or function relating the CI to the operational parameter, but may also be a table, data set, or other process or system describing the correlation between the CI data and the operational parameters. Thus, $CI_{TYP}$=f(Op. Param. (i)), where f( ) is a function of the CI model, and f(Op. Param. (i)) is the function applied to the actual operational parameter at index (i).

In block 611, the a typical CI value ($CI_{TYP}(i)$) is generated for the operational parameter, with $CI_{TYP}(i)$ representing a typical, or modelled, value at the operational parameter at which the actual CI (CI(i)) value was measured. In some embodiments, the actual operational parameter is used to generate $CI_{TYP}(i)$ by applying the CI model. For example, where the model relates engine RPM to a vibration reading though the function f( ) a typical CI $CI_{TYP}$ may be determined by applying the model to a relevant engine RPM for an actual vibration reading. The resulting typical CI for the index (i) $CI_{TYP}(i)$ would be the expected, typical, or projected vibration that would be expected at the relevant engine RPM at index (i). The variance between the actual CI CI(i) and the typical CI $CI_{TYP}$ (i) potentially indicates the unexpected operation of the relevant element. For example, for a vibration sensor that is in a vehicle transmission and that takes vibration measurements at a particular engine RPM, an actual CI CI(i) indicating a magnitude of vibration that is greater than the typical vibration magnitude $CI_{TYP}$ (i) at the expected RPM may indicate excess vibration associated with a component in the transmission being worn, chipped, fouled, or otherwise damaged since the vibration is greater than expected. The system may analyze a set of actual CIs CI($i_1 \ldots i_N$) over multiple readings to determine whether the actual CIs CI($i_1 \ldots i_N$) indicate an ongoing, growing, or transient issue with vibration.

In block 613, one or more nominal operational parameters are determined. The nominal operational parameter is within a range associated with the CI model. The nominal operational parameter is used as a target for normalizing or adjusting the actual CIs. Thus, the nominal operational parameter may be selected or set to optimize system analysis and failure detection.

In block 615, the CI model is applied to the nominal operational parameter (Nom. Op. Param) to get the nominal CI value ($CI_{NOM}$). Thus, $CI_{NOM}$=f(Nom. Op. Param.), where f( ) is the function of the CI model, and f(Nom. Op. Param.) is the function applied to the nominal operational parameter.

In block 617, the nominal CI value ($CI_{NOM}$) is generated for the nominal operational parameter, with $CI_{NOM}$ representing the expected or typical CI value ($CI_{NOM}$) at the selected nominal operational parameter according to the CI model. In some embodiments, the nominal CI value is generated once using the same model when it is fed the flight parameter data for a nominal condition. Thus, the nominal CI value may be calculated and reused for multiple analysis processes being run on actual CI conditions falling within a predetermined range associated with the nominal operational parameter.

In block 619, a correction factor $F_{CI}(i)$ is determined. In some embodiments, the correction factor $F_{CI}(i)$ is a value associated with the measured or actual CI CI(i) and typical CI $CI_{TYP}(i)$ at index (i). The nominal CI value $CI_{NOM}$ is compared to the typical CI $CI_{TYP}(i)$ to get the correction factor $F_{CI}(i)$. In some embodiments, the correction factor $F_{CI}(i)$ is determined according to the difference between the typical CI $CI_{TYP}(i)$ and the nominal CI value. Thus, the correction factor $F_{CI}(i)$ may, in some embodiments, be determined according to formula (1).

$$F_{CI}(i)=CI_{NOM}-CI_{TYP}(i) \quad (1)$$

In block 621, the correction factor $F_{CI}(i)$ is applied to the actual CI CI(i), and in block 623, the corrected or adjusted CI value $CI_{CORR}(i)$ is generated. In some embodiments, the actual CI CI(i) is corrected, adjusted or normalized according to the correction factor $F_{CI}(i)$ to generate the adjusted CI value $CI_{CORR}(i)$. Thus, the adjusted CI value $CI_{CORR}(i)$ may, in some embodiments, be determined according to formula (2).

$$CI_{CORR}(i)=CI(i)-F_{CI}(i) \quad (2)$$

The process of applying the model to a CI may be performed for each CI in a data set to generate an adjusted CI data set. Each data point in the adjusted CI data set will then have reduced noise and be normalized so that each CI may be treated as having been measured at the nominal operational parameter.

Figure 7:
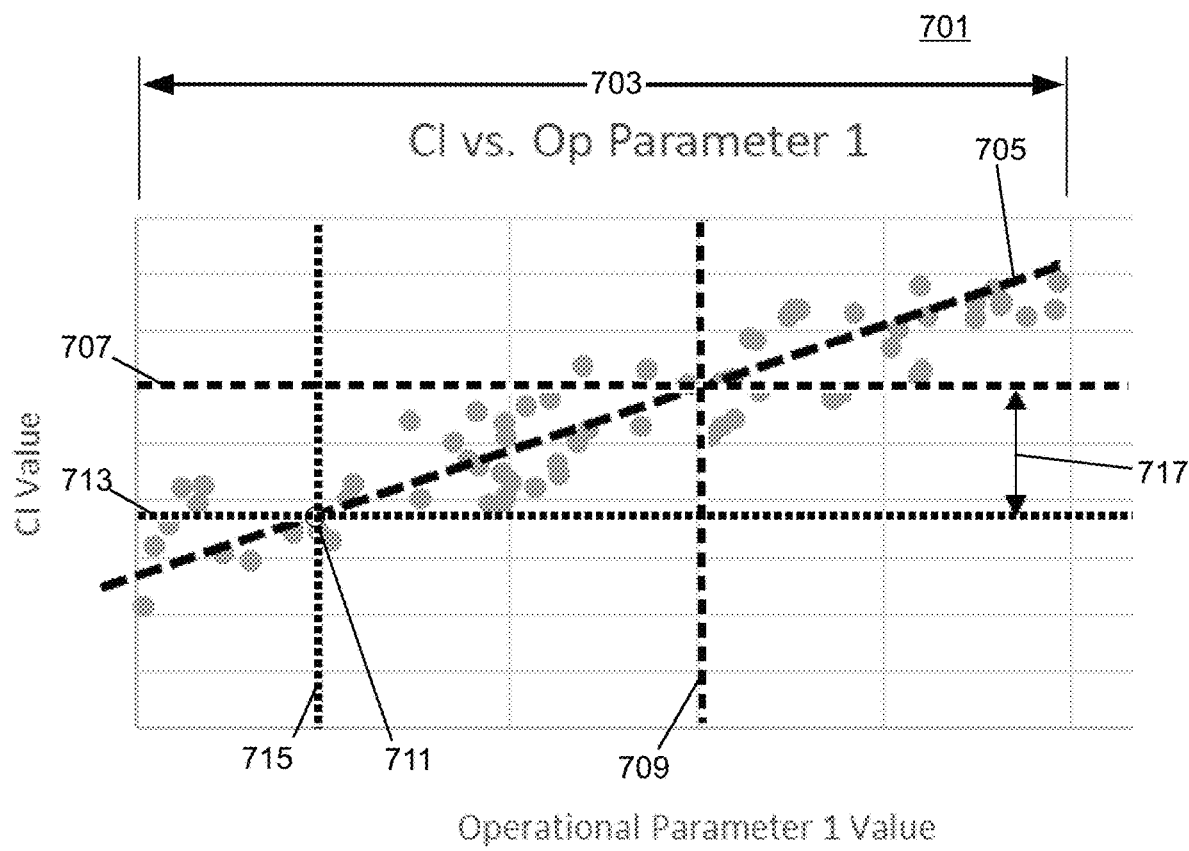
FIG. 7 is a chart illustrating a graphical representation of the application of the CI model according to some embodiments.

FIG. 7 is a chart 701 illustrating a graphical representation of the application of the CI model according to some embodiments. The chart 701 uses a single operational parameter or condition P1. The chart 701 shows the operational parameter P1 on the x-axis versus the CI value on the y-axis. Additionally, the chart 701 illustrates a simple CI model 705 generated using linear regression. However, the chart 701 is exemplary and not intended to be limiting, as additional parameters and more complex models can be used.

In some embodiments, the values for operational parameter P1 could be values for example, of torque in a monitored drive system, and the CI values could be vibration levels at a particular frequency of interest, such as a gear mesh frequency for gears in a transmission. The data points represent past observations that are used in training the CI model 705, and the CI model 705 is superimposed on the training data for illustrative purposes.

A value of nominal operational parameter 709 is within the range 703 over which data is acquired or for which the CI model 705 is designed. For a given value of the nominal operational parameter 709 within the range 703, the CI model 705 can be used to determine a nominal CI value CINOM 707. During an acquisition, for example, at index value (i), a new observation is made, and this observation includes a CI value or sensor reading, and an associated or actual operational parameter P1(i) 715 associated with the actual CI acquired at index (i). The value for the actual operational parameter P1(i) 715 can be used to determine the predicted or typical CI value $CI_{TYP}(i)$ 713, by determining the location 711 where the operational parameter value P1(i) 715 falls on the CI model 705. The difference 717 between the nominal CI value CINOM 707 and the predicted or typical CI value $CI_{TYP}(i)$ 713 is the correction factor $F_{CI}(i)$ for the actual CI value CI(i) associated with the operational parameter P1(i) 715. Applying the correction factor $F_{CI}(i)$ to the actual CI(i) shifts the actual CI(i) along the CI model 705, effectively changing the actual operational parameter value P1(i) 715 to the nominal operational parameter 709. Using the predicted or typical CI value $CI_{TYP}(i)$ 713 permits shifting of the actual operational parameter 715 P1(i) without influencing the shift to the nominal operational parameter 709 by any abnormal value in the actual CI value CI(i).

Figure 8A:
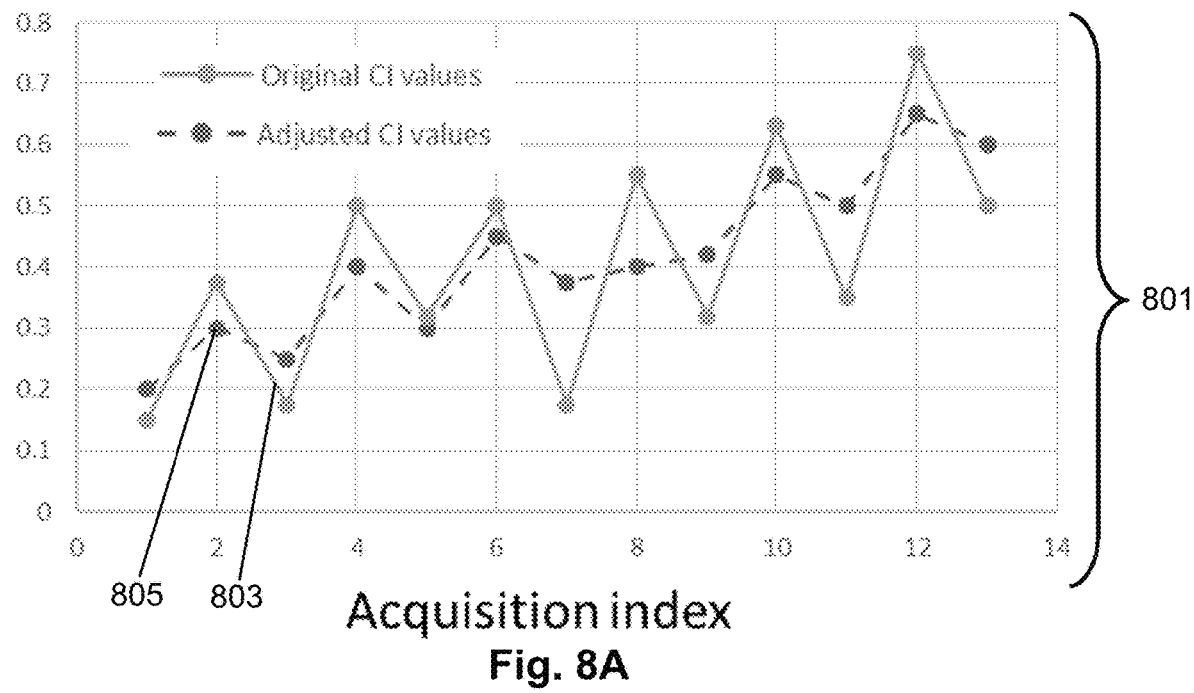
FIGS. 8A and 8B illustrate adjusted CI values with respect to the actual or original CI values according to some embodiments.
Figure 8B:
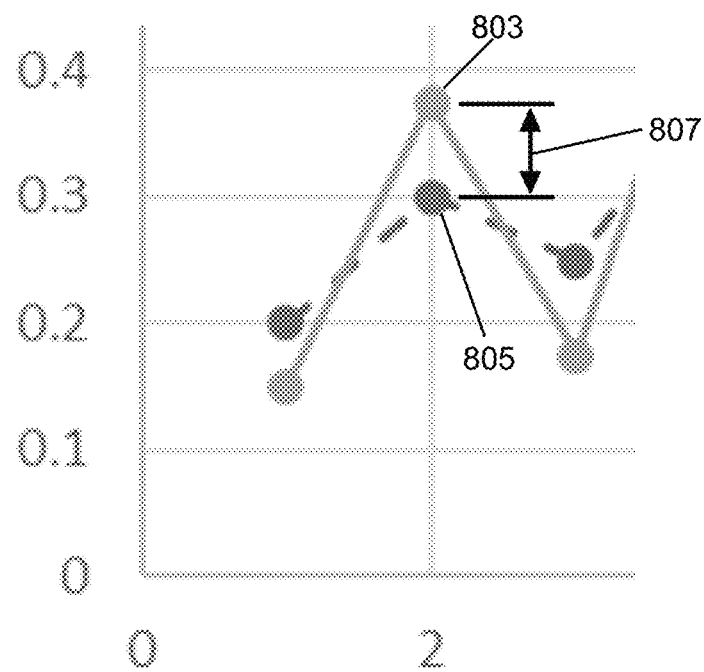

FIGS. 8A and 8B illustrate adjusted CI values 805 with respect to the actual or original CI values according to some embodiments. FIG. 8A illustrates a data set 801 with a plurality of original CI values 803. One or more original CI values 803 may be adjusted so that each original CI value 803 has a corresponding adjusted CI value 805, resulting in CIs with less noise. FIG. 8B focuses on acquisition index 2. The correction factor 807 is calculated and then subtracted from the original CI value 803 to determine the corrected or adjusted CI value 805. As shown in FIG. 8A, there is less noise in the data, so alerts or issues indicated by the CI data can be more easily ascertained.

Figure 8C:
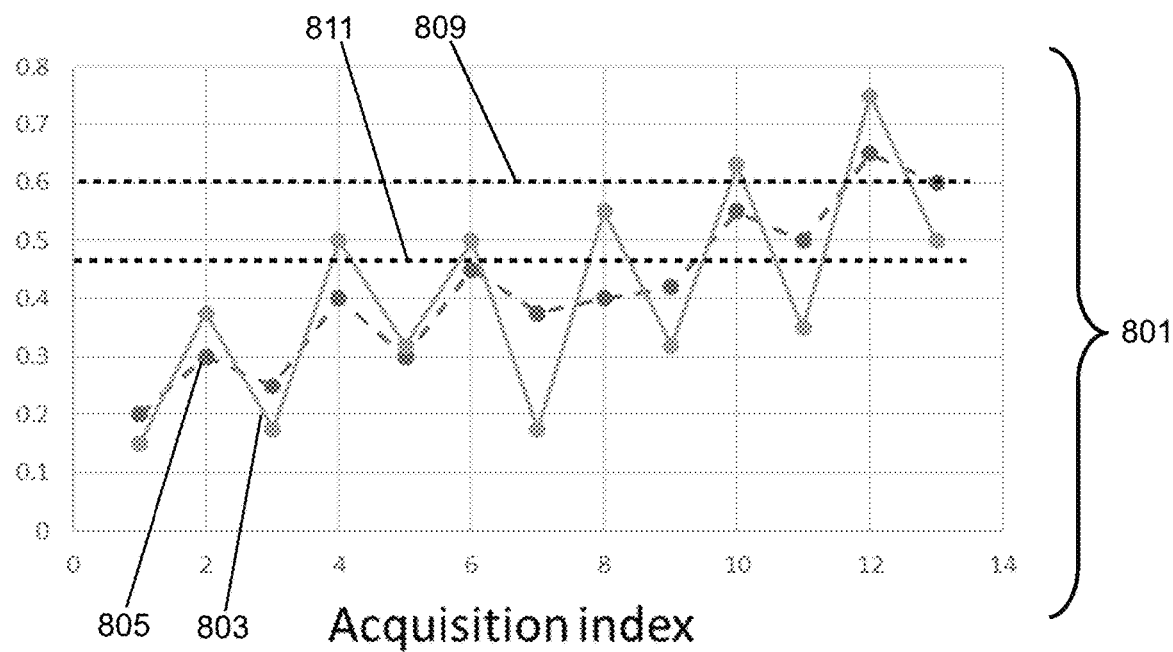
FIG. 8C illustrates adjusted CI values 805 with respect to one or more alert thresholds according to some embodiments.

FIG. 8C illustrates adjusted CI values 805 with respect to one or more alert thresholds 809, 811 according to some embodiments. In some embodiments, the alert threshold may include one or more thresholds, and each threshold may be associated with a different alert severity. For example, a warning alert threshold 809 may be higher than, or associated with a higher CI magnitude, than a caution alert threshold 811. The use of the adjusted CI values 805 reduces noise in the original CI values 803, which provides for a smoother CI value data set after adjustment and a more consistent relationship with the alert thresholds.

Figure 9:
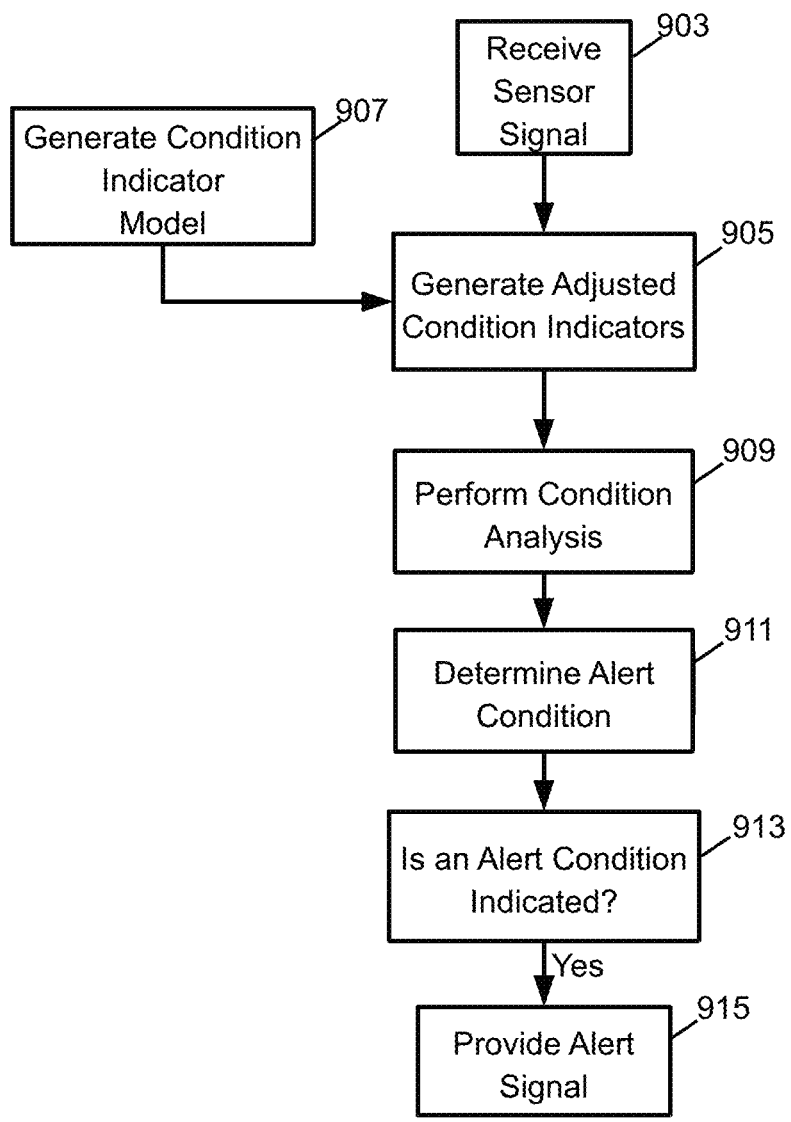
FIG. 9 is a flow diagram illustrating a method for providing an alert signal for condition indicators using adjusted CI data according to some embodiments.

FIG. 9 is a flow diagram illustrating a method 901 for providing an alert signal for condition indicators using adjusted CI data according to some embodiments. The method may be performed by a system having a data terminal and data server, and may be embodied in a software program stored on a non-transitory computer-readable storage medium that is executed by a processor of the data terminal and a processor of the data server.

In block 903, one or more sensor signals are received. In some embodiments, a sensor generates the sensor signal and provides the sensor signal to a data collection element in a data terminal. In some embodiments, the sensor signal includes condition data used to generate one or more CIs, includes the CIs, or includes other data related to the CIs. The sensor may continuously send the sensor signal for sampling by the data collection element, may send the sensor signal in response to a query, activation signal or the like, may send the sensor signal in response to a predetermined condition, may store the sensor signal, or data in the sensor signal, for processing at the sensor device, or may send or provide the signal according to another procedure. In block 907, the CI model is generated. The CI model may be generated as described above, and may be generated periodically, prior to receiving the sensor signal, contemporaneously with the receiving of the sensor signal, or as part of the condition analysis process. Additionally, in some embodiments, generation of the CI model may include identifying the nominal operational parameter and generating the nominal condition indicator.

Adjusted CIs are generated in block 905. In some embodiments, one or more CIs are generated from a sensor signal or from data included in, or indicated by, the sensor signal. In some embodiments, different condition indicators are derived from different subsignals in the sensor signal. In other embodiments, multiple readings from a sensor, or readings from multiple sensors, may be combined or otherwise used to generate a CI. For example, condition data from an accelerometer and from a tachometer may be included in a sensor signal and may be used to generate synchronous time average vibration data or CIs. Additionally, in some embodiments, the condition indicator may be generated at the sensor, at a data terminal or at a data server. The adjusted CIs may be generated by applying the CI model to the condition indicators to normalize the CIs, or adjust the operational parameter associated with a CI to align with the nominal operational parameters.

In block 909, condition analysis is performed. The adjusted CIs may be analyzed to determine or identify a one or more trends in the adjusted CI data. In some embodiments, the condition analysis may be based on one or more moving averages of the adjusted CI data. In other embodiments, a projection based on the adjusted CI data, or other analysis may be performed.

In block 911 an alert indication is determined. In some embodiments, the alert is indicated based on the comparison of the adjusted CI data to the alert threshold, for example, by an adjusted CI exceeding one or more alert thresholds. In some embodiments, an alert threshold is a trend threshold for the condition indicator. The alert threshold may be is fixed or predetermined, and may, in some embodiments, be an adaptable alert threshold. In some embodiments, the alert threshold may include on one or more thresholds, and each threshold may be associated with a different alert severity.

The collection of sensor data, determining of the threshold, moving average and moving average difference, comparison of the of the CIs to the threshold and determining the alert indication may be repeated any number of times and performed periodically or continuously. Thus, for example, after determining an alert indication in block 911, the system may receive a new sensor signal in block 903 and repeat the method 901 one or more times. In another example, after receiving a new sensor signal in block 903, the system may generate a new set of adjusted condition indicators in block 905 from a newly received sensor signal and repeat the method 901.

In block 913, a determination is made on whether an alert is indicated, and if the alert is indicated, then an alert signal is provided in block 915. In some embodiments, the alert system or data server may activate an in-vehicle alert, for example, by lighting a trouble lamp in a vehicle cockpit, displaying a warning message on a cockpit display, or by providing an out-of-vehicle message by automatically message a fleet operator, vehicle owner, maintenance technician, or the like by email, short messaging system (SMS) message, text message, automated voice call, or the like. In some embodiments, the alert system may generate an alert and display an indicator on a management web page, maintenance checklist, vehicle record, or the like. In some embodiments, the alert signal is a problem report generated by a data server indicating a problem or warning for the system or element related to the condition indicators. Additionally, the alert system may indicate a level of problem or alert, for example, by providing an alert severity. In some embodiments, an in-vehicle alert and a remote alert may be used in combination.

Figure 10:
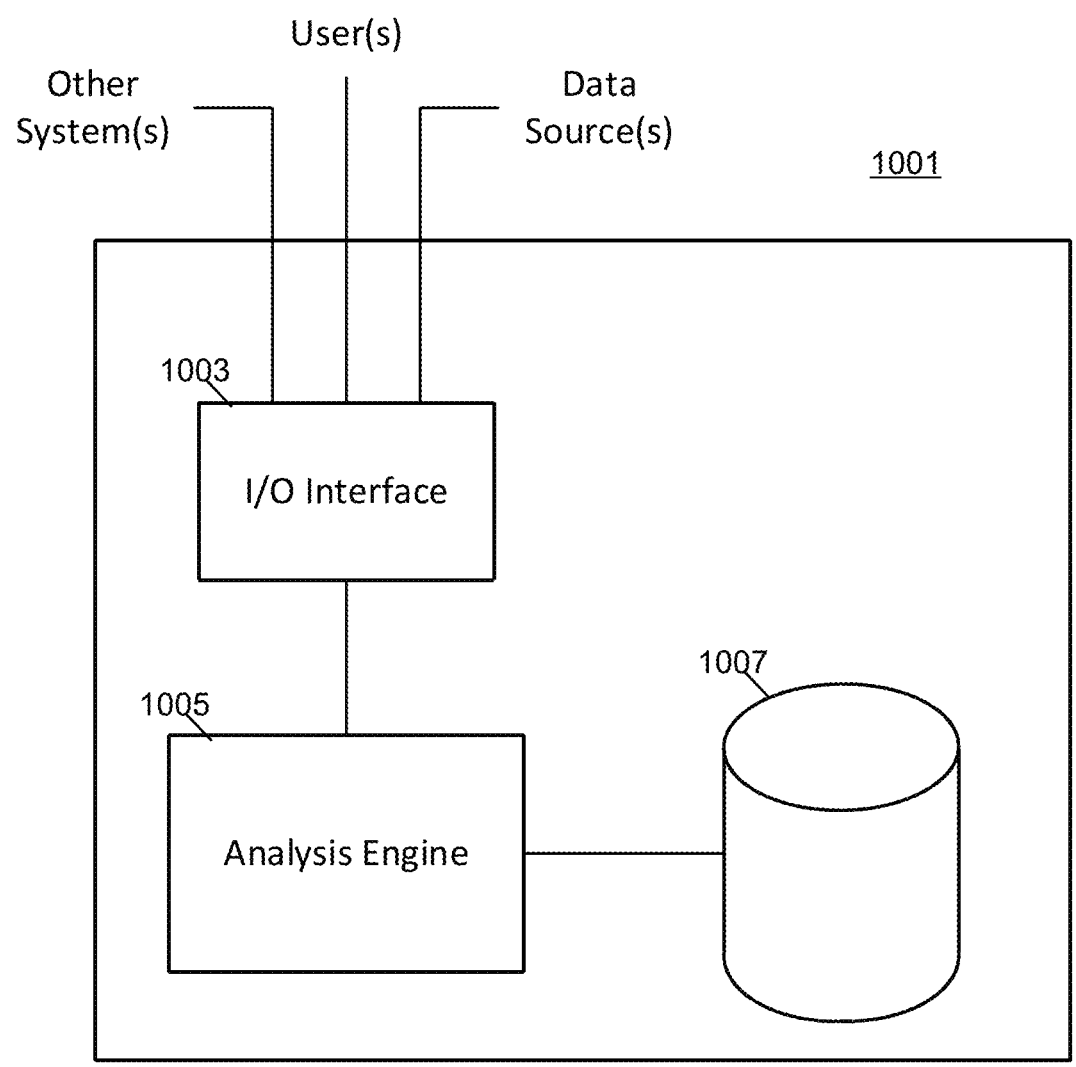
FIG. 10 is a diagram illustrating a computer system that may be used to implement a system, data terminal, or data server according to some embodiments.

FIG. 10 is a diagram illustrating a computer system 1001 that may be used to implement a system, data terminal, or data server according to some embodiments. The computer system 1001 can include an input/output (I/O) interface 1003, an analysis engine 1005, and a database 1007. Alternative embodiments can combine or distribute the I/O interface 1003, the analysis engine 1005, and the database 1007, as desired. Embodiments of the computer system 1001 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multipurpose machines, for example computer workstations, that are suitable for also performing other tasks.

The I/O interface 1003 can provide a communication link between external users, systems, and data sources and components of the computer system 1001. The I/O interface 1003 can be configured for allowing one or more users to input information to the computer system 1001 via any known input device. Examples can include a keyboard, mouse, touch screen, and/or any other desired input device. The I/O interface 1003 can be configured for allowing one or more users to receive information output from the computer system 1001 via any known output device. Examples can include a display monitor, a printer, cockpit display, and/or any other desired output device. The I/O interface 1003 can be configured for allowing other systems to communicate with the computer system 1001. For example, the I/O interface 1003 can allow one or more remote computer(s) to access information, input information, and/or remotely instruct the computer system 1001 to perform one or more of the tasks described herein. The I/O interface 1003 can be configured for allowing communication with one or more remote data sources. For example, the I/O interface 1003 can allow one or more remote data source(s) to access information, input information, and/or remotely instruct the computer system 1001 to perform one or more of the tasks described herein.

The database 1007 provides persistent data storage for the computer system 1001. Although the term "database" is primarily used, a memory or other suitable data storage arrangement may provide the functionality of the database 1007. In alternative embodiments, the database 1007 can be integral to or separate from the computer system 1001 and can operate on one or more computers. The database 1007 preferably provides non-volatile data storage for any information suitable to support the operation of the flight control system 201 and the methods 401, 601, or 901, including various types of data discussed further herein. The analysis engine 1005 can include various combinations of one or more processors, memories, and software components.

An embodiment system includes a sensor operable to make a sensor reading for a vehicle during operation of the vehicle and generate a sensor signal associated with the sensor reading, and a data server operable to acquire a condition indicator model that correlates one or more operational parameters with condition indicators, wherein the data server is further operable to acquire a current condition indicator according to the sensor signal, wherein the current condition indicator is associated with the one or more operational parameters, wherein the data server is further operable to generate an adjusted condition indicator by adjusting the current condition indicator according to the condition indicator model, wherein the data server is further operable to determine whether an alert condition is indicated, according to at least the adjusted condition indicator, by a condition indicator set that includes the adjusted condition indicator, and wherein the data server is further operable to provide an alert in response to determining that the alert condition is indicated.

In some embodiments, the data server being operable to acquire the condition indicator model includes the data server being operable to generate the condition indicator model according to sensor data that is received from the sensor before the sensor makes the sensor reading and that is identified as accurate baseline data. In some embodiments, the data server being operable to generate the adjusted condition indicator includes the data server being operable to determine a correction factor for the current condition indicator according to the condition indicator model, and further includes the data server being operable to generate the adjusted condition indicator by adjusting the current condition indicator according to the correction factor. In some embodiments, wherein the data server being operable to determine the correction factor according to the condition indicator model includes the data server being operable to determine, according to the condition indicator model, a nominal condition indicator at a predetermined nominal operational parameter, and further includes the data server being operable to determine the correction factor according to the nominal condition indicator. In some embodiments, the data server being operable to determine the correction factor according to the condition indicator model further includes the data server being operable to determine, according to the condition indicator model, a typical condition indicator for a measured operational parameter associated with current condition indicator, and further includes the data server being operable to determine the correction factor according to a difference between the nominal condition indicator and the typical condition indicator. In some embodiments, the sensor reading includes measurement of a vibration of the vehicle, and wherein the one or more operational parameters include a revolutions per minute (RPM) of an engine or an engine torque.

An embodiment data server includes a processor, and a non-transitory computer-readable storage medium storing a program to be executed by the processor, the program including instructions for receiving data indicating a sensor reading taken for machinery during operation of the machinery, acquiring a condition indicator model that correlates one or more operational parameters with condition indicators, acquiring a current condition indicator associated with the sensor reading, wherein the current condition indicator is associated with a measured operational parameter that is within the one or more operational parameters, generating an adjusted condition indicator by adjusting the current condition indicator according to the condition indicator model, determining whether an alert condition is indicated, according to at least the adjusted condition indicator, by a condition indicator set that includes the adjusted condition indicator, and providing an alert in response to determining that the alert condition is indicated.

In some embodiments, the instructions for acquiring the condition indicator model include instructions for generating the condition indicator model according to baseline data associated with the sensor. In some embodiments, the baseline data includes sensor data that is taken by the sensor before the sensor makes the sensor reading and that is identified as accurate baseline data. In some embodiments, the instructions for generating the adjusted condition indicator include instructions for determining a correction factor for the current condition indicator according to the condition indicator model, and further include instructions for generating the adjusted condition indicator by adjusting the current condition indicator according to the correction factor. In some embodiments, the instructions for determining the correction factor according to the condition indicator model include instructions for determining, according to the condition indicator model, a nominal condition indicator at a predetermined nominal operational parameter, and determining the correction factor according to the nominal condition indicator. In some embodiments, the adjusting the current condition indicator according to the correction factor includes aligning the measured operational parameter with the nominal operational parameter by adjusting the current condition indicator according to the correction factor. In some embodiments, the instructions for determining the correction factor according to the condition indicator model further include instructions for determining, according to the condition indicator model, a typical condition indicator for a measured operational parameter associated with current condition indicator, and further include instructions for determining the correction factor according to the nominal condition indicator and the typical condition indicator. In some embodiments, the sensor reading includes measurement of a vibration of the machinery.

An embodiment method includes acquiring first data indicating a first sensor reading, acquiring a condition indicator model associated with one or more operational parameters and one or more condition indicators, acquiring a current condition indicator according to the first data, wherein the current condition indicator is for an index (i), generating an adjusted condition indicator for the index (i) by adjusting the current condition indicator according to the condition indicator model, determining, according to at least the adjusted condition indicator, whether an alert condition is indicated by a condition indicator set that includes the adjusted condition indicator, and providing an alert in response to determining that the alert condition is indicated.

In some embodiments, the acquiring the condition indicator model comprises generating the condition indicator model according to baseline data associated with the sensor. In some embodiments, the generating the adjusted condition indicator comprises determining a correction factor for the index (i) according to the condition indicator model, and generating the adjusted condition indicator for the index (i) by adjusting the current condition indicator for the index (i) according to the correction factor for the index (i). In some embodiments, the determining the correction factor for the index (i) comprises determining, according to the condition indicator model, a nominal condition indicator at a predetermined nominal operational parameter, and determining the correction factor according to the nominal condition indicator. In some embodiments, the determining the correction factor according to the condition indicator model further comprises determining, according to the condition indicator model, a typical condition indicator for an operational parameter associated with current condition indicator and for the index (i), and determining the correction factor according to a difference between the nominal condition indicator and the typical condition indicator for the index (i). In some embodiments, the adjusting the current condition indicator comprises aligning an operational parameter that is for the index (i) and that is associated with the current condition indicator for the index (i) with the nominal operational parameter by adjusting the current condition indicator according to the correction factor.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system, comprising:
a sensor operable to make a sensor reading for a vehicle during operation of the vehicle and generate a sensor signal associated with the sensor reading; and
a data server operable to acquire a condition indicator model that correlates one or more operational parameters with condition indicators;
wherein the data server is further operable to acquire a current condition indicator according to the sensor signal, wherein the current condition indicator is associated with a first operational parameter value that is a value of a first operational parameter of the one or more operational parameters, and wherein the current condition indicator is a value indicating a condition of the vehicle when operating at the first operational parameter;
wherein the data server is further operable to determine, according to the condition indicator model, a nominal condition indicator at a predetermined nominal operational parameter;
wherein the data server is further operable to determine, according to the condition indicator model, a typical condition indicator for the first operational parameter associated with the current condition indicator, wherein the typical condition indicator is a value indicating an expected value for a condition indicator while the vehicle is operating at the first operating parameter;
wherein the data server is further operable to determine a correction factor according to a difference between the nominal condition indicator and the typical condition indicator;
wherein the data server is further operable to generate an adjusted condition indicator by adjusting the current condition indicator according to the correction factor; and
wherein the data server is further operable to determine whether an alert condition is indicated by a condition indicator set that includes the adjusted condition indicator, and wherein the data server is further operable to provide an alert in response to determining that the alert condition is indicated.

2. The system of claim 1, wherein the data server being operable to acquire the condition indicator model includes the data server being operable to generate the condition indicator model according to sensor data that is received from the sensor before the sensor makes the sensor reading and that is identified as accurate baseline data.

3. The system of claim 1, wherein the sensor reading includes measurement of a vibration of the vehicle, and wherein the one or more operational parameters include a revolution per minute (RPM) of an engine or an engine torque.

4. A data server, comprising:
a processor; and
a non-transitory computer-readable storage medium storing a program to be executed by the processor, the program including instructions for:
receiving data indicating a sensor reading taken for machinery during operation of the machinery;
acquiring a condition indicator model that correlates one or more operational parameters with condition indicators;
acquiring a current condition indicator associated with the sensor reading, wherein the current condition indicator is associated with a measured operational parameter that is an operational parameter of the one or more operational parameters, wherein the current condition indicator is a value indicating a condition of the machinery when operating at the measured operational parameter;

determining, according to the condition indicator model, a nominal condition indicator at a predetermined nominal operational parameter;

determining, according to the condition indicator model, a typical condition indicator for the measured operational parameter associated with the current condition indicator, wherein the typical condition indicator is a value indicating an expected value for a condition indicator while the machinery is operating at the measured operating parameter;

determining a correction factor according to a difference between the nominal condition indicator and the typical condition indicator;

generating an adjusted condition indicator by adjusting the current condition indicator according to the correction factor;

determining whether an alert condition is indicated, according to at least the adjusted condition indicator, by a condition indicator set that includes the adjusted condition indicator; and providing an alert in response to determining that the alert condition is indicated.

5. The data server of claim 4, wherein the instructions for acquiring the condition indicator model include instructions for generating the condition indicator model according to baseline data associated with the sensor.

6. The data server of claim 5, wherein the baseline data includes sensor data that is taken by the sensor before the sensor makes the sensor reading and that is identified as accurate baseline data.

7. The data server of claim 4, wherein the sensor reading includes measurement of a vibration of the machinery.

8. A method, comprising:
acquiring first data indicating a first sensor reading;
acquiring a condition indicator model associated with one or more operational parameters and one or more condition indicators;
acquiring a current condition indicator according to the first data, wherein the current condition indicator is for an index (i), and is associated with a first operational parameter value that is a value of a first operational parameter of the one or more operational parameters, and wherein the current condition indicator is a value indicating a condition of machinery when operating at the first operational parameter at index (i);
determining, according to the condition indicator model for the index (i), a nominal condition indicator at a predetermined nominal operational parameter;
determining, according to the condition indicator model, a typical condition indicator for the first operational parameter associated with the current condition indicator and the index (i), wherein the typical condition indicator is a value indicating an expected value for a condition indicator while the machinery is operating at the first operating parameter;

determine a correction factor according to a difference between the nominal condition indicator and the typical condition indicator for the index (i);

generating an adjusted condition indicator for the index (i) by adjusting the current condition indicator for the index (i) according to the correction factor for the index (i);

determining, according to at least the adjusted condition indicator, whether an alert condition is indicated by a condition indicator set that includes the adjusted condition indicator; and providing an alert in response to determining that the alert condition is indicated.

9. The method of claim 8, wherein the acquiring the condition indicator model comprises generating the condition indicator model according to baseline data associated with the sensor.

10. The method of claim 8, wherein the adjusting the current condition indicator comprises aligning an operational parameter that is for the index (i) and that is associated with the current condition indicator for the index (i) with the nominal operational parameter by adjusting the current condition indicator according to the correction factor.

11. The system according to claim 1, wherein the nominal operational parameter is within a range associated with the condition indicator model.

12. The system according to claim 1, wherein the nominal condition indicator value is determined once and reused for multiple analysis processes being run on actual condition indicators falling within a predetermined range associated with the nominal operational parameter.

13. The system according to claim 1, wherein the alert condition being indicated comprises the adjusted condition indicator exceeding a threshold.

14. The data server according to claim 4, wherein the nominal operational parameter is within a range associated with the condition indicator model.

15. The data server according to claim 4, wherein the nominal condition indicator value is determined once and reused for multiple analysis processes being run on actual condition indicators falling within a predetermined range associated with the nominal operational parameter.

16. The data server according to claim 4, wherein the alert condition being indicated comprises the adjusted condition indicator exceeding a threshold.

17. The method according to claim 8, wherein the nominal operational parameter is within a range associated with the condition indicator model.

18. The method according to claim 8, wherein the nominal condition indicator value is determined once and reused for multiple analysis processes being run on actual condition indicators falling within a predetermined range associated with the nominal operational parameter.

19. The method according to claim 8, wherein the alert condition being indicated comprises the adjusted condition indicator exceeding a threshold.

* * * * *